(12) United States Patent
Lambert et al.

(10) Patent No.: US 12,345,899 B2
(45) Date of Patent: Jul. 1, 2025

(54) SYSTEM AND METHOD FOR PASSIVE 3D DISPLAY

(71) Applicant: BARCO N.V., Kortrijk (BE)

(72) Inventors: Jasper Irené Lambert, Waregem (BE); Katrien Nicole Marie Noyelle, Gullegem (BE)

(73) Assignee: BARCO N.V., Kortrijk (BE)

( * ) Notice: Subject to any disclaimer, the term of this patent is extended or adjusted under 35 U.S.C. 154(b) by 680 days.

(21) Appl. No.: 17/427,183

(22) PCT Filed: Feb. 5, 2019

(86) PCT No.: PCT/EP2019/052801
§ 371 (c)(1),
(2) Date: Jul. 30, 2021

(87) PCT Pub. No.: WO2020/160759
PCT Pub. Date: Aug. 13, 2020

(65) Prior Publication Data
US 2022/0128835 A1    Apr. 28, 2022

(51) Int. Cl.
*G02B 30/25*    (2020.01)

(52) U.S. Cl.
CPC .................................. *G02B 30/25* (2020.01)

(58) Field of Classification Search
CPC ........ G02B 30/25; G02B 30/00; G02B 30/26; G02B 27/22; G02B 5/30; G02B 5/3083; G02B 5/3025; G02B 5/201; G02B 2027/0134; G02B 2027/0178; G02B 2027/0112; G09F 9/33; G09F 9/3026; G09F 9/302; G09F 19/125; H04N 13/04; H04N 13/00; H04N 13/337; H04N 13/324; H04N 13/257; H04N 13/359; H04N 13/356; H04N 2013/0074; H04N 2013/0077; H04N 25/134; H04N 23/12; H04N 9/3182; G06T 2207/100024; H01L 27/1462; H01K 59/30; H01K 59/353; H01K 59/352; G02F 2201/52; G02F 2201/12; G02F 2201/123; G02F 1/133528; G02F 1/133514
(Continued)

(56) References Cited

U.S. PATENT DOCUMENTS 3,971,065 A    7/1976 Bayer
5,537,144 A *  7/1996 Faris .................... G03B 21/132
                                          348/E13.058
(Continued)

FOREIGN PATENT DOCUMENTS

CN    101452118 A    6/2009
CN    102340683 A    2/2012
(Continued)

OTHER PUBLICATIONS

Office Action issued in corresponding Chinese Application No. 201980091179.7, dated Sep. 9, 2023, with English translation.
(Continued)

*Primary Examiner* — Jyotsna V Dabbi
(74) *Attorney, Agent, or Firm* — HSML P.C.

(57) ABSTRACT

A system and method for displaying 3D images using polarization filters. The polarization patterns can be configured to optimize the distribution of green sub-pixels in each image and obtain an increased resolution in 3D.

16 Claims, 4 Drawing Sheets

(58) Field of Classification Search
USPC ...... 359/462–465; 348/42–60, 277; 353/7–9; 349/8–9, 15
See application file for complete search history.

(56) References Cited

U.S. PATENT DOCUMENTS

| | | | |
|---|---|---|---|
| 9,423,602 | B1 | 8/2016 | Dolgoff |
| 2014/0002897 | A1 | 1/2014 | Krijn et al. |
| 2014/0015939 | A1 | 1/2014 | Mount et al. |
| 2014/0085352 | A1 | 3/2014 | Langendijk |
| 2014/0184800 | A1* | 7/2014 | Hirai .................. G06V 20/588 348/148 |
| 2014/0362200 | A1* | 12/2014 | Kanamori .......... A61B 1/00186 348/70 |
| 2015/0062399 | A1* | 3/2015 | Ishihara ............... G02B 27/646 348/302 |
| 2016/0234487 | A1 | 8/2016 | Kroon et al. |
| 2016/0323566 | A1 | 11/2016 | Vdovin et al. |

FOREIGN PATENT DOCUMENTS

| | | |
|---|---|---|
| CN | 103345887 A | 10/2013 |
| CN | 103348687 A | 10/2013 |
| CN | 103563368 A | 2/2014 |
| CN | 105849623 A | 8/2016 |
| CN | 106782098 A | 5/2017 |
| EP | 1575303 A1 | 9/2005 |

OTHER PUBLICATIONS

Office Action issued in corresponding Taiwanese Application No. 108148166, dated Sep. 27, 2023, with English translation.
Communication issued in European Application No. 19706401.7, dated Oct. 13, 2023.
Taiwanese Office Action issued in corresponding Taiwanese Application No. 108148166, dated Jun. 13, 2023, 29 pages, machine translation provided.
International Search Report and Written Opinion issued in PCT/EP2019/052801, dated Oct. 8, 2019, 9 pages provided.
The Second Written Opinion issued in PCT/EP2019/052801, dated Jan. 23, 2020.
The International Preliminary Report on Patentability issued in PCT/EP2019/052801, dated May 18, 2021.

* cited by examiner

| p | s | p | s | p | s |—30
|---|---|---|---|---|---|
| s | p | s | p | s | p |—31
| s | p | s | p | s | p |
| p | s | p | s | p | s |
| p | s | p | s | p | s |
| s | p | s | p | s | p | b)

| s | p | p | s | s | p |
|---|---|---|---|---|---|
| s | p | p | s | s | p |
| p | s | s | p | p | s |
| p | s | s | p | p | s |
| s | p | p | s | s | p |
| s | p | p | s | s | p | c)

| s | p | s | p | s | p |
|---|---|---|---|---|---|
| p | s | p | s | p | s |
| s | p | s | p | s | p |
| p | s | p | s | p | s |
| s | p | s | p | s | p |
| p | s | p | s | p | s | d)

| s | s | p | p | s | s |
|---|---|---|---|---|---|
| p | p | s | s | p | p |
| s | s | p | p | s | s |
| p | p | s | s | p | p |
| s | s | p | p | s | s |
| p | p | s | s | p | p | e)

| s | s | s | s | s | s |
|---|---|---|---|---|---|
| s | s | s | s | s | s |
| p | p | p | p | p | p |
| p | p | p | p | p | p |
| s | s | s | s | s | s |
| s | s | s | s | s | s | f)

| s | s | p | p | s | s |
|---|---|---|---|---|---|
| s | s | p | p | s | s |
| s | s | p | p | s | s |
| s | s | p | p | s | s |
| s | s | p | p | s | s |
| s | s | p | p | s | s | g)

| s | s | p | p | s | s |
|---|---|---|---|---|---|
| p | s | s | p | p | s |
| p | p | s | s | p | p |
| s | p | p | s | s | p |
| s | s | p | p | s | s |
| p | s | s | p | p | s | h)

| p | p | s | s | p | p |
|---|---|---|---|---|---|
| p | p | s | s | p | p |
| s | p | p | s | s | p |
| s | p | p | s | s | p |
| p | p | s | s | p | p |
| p | p | s | s | p | p | i)

| p | p | s | s | p | p |
|---|---|---|---|---|---|
| p | p | p | p | p | p |
| s | s | p | p | s | s |
| s | s | s | s | s | s |
| p | p | s | s | p | p |
| p | p | p | p | p | p | j)

| p | s | s | s | p | s |
|---|---|---|---|---|---|
| p | s | p | p | p | s |
| s | s | p | s | s | s |
| p | p | p | s | p | p |
| p | s | s | s | p | s |
| p | s | p | p | p | s | k)

| p | s | p | s | p | s |
|---|---|---|---|---|---|
| p | s | p | s | p | s |
| s | s | s | s | s | s |
| p | p | p | p | p | p |
| p | s | p | s | p | s |
| p | s | p | s | p | s | l)

| p | s | s | s | p | s |
|---|---|---|---|---|---|
| p | s | p | p | p | s |
| p | s | s | s | p | s |
| p | s | p | p | p | s |
| p | s | s | s | p | s |
| p | s | p | p | p | s | m)

| p | p | s | p | p | p |
|---|---|---|---|---|---|
| s | s | s | s | s | s |
| s | p | p | p | s | p |
| s | p | s | p | s | p |
| p | p | s | p | p | p |
| s | s | s | s | s | s | n)

| s | s | p | s | s | s |
|---|---|---|---|---|---|
| p | s | p | p | p | s |
| p | s | s | s | p | s |
| p | p | p | s | p | p |
| s | s | p | s | s | s |
| p | s | p | p | p | s |

SYSTEM AND METHOD FOR PASSIVE 3D DISPLAY

The present invention relates to a passive 3D display system and display method e.g. with improved resolution.

BACKGROUND

In three-dimensional (3D) imaging, a common principle is to split the image or video content into two images, one image for each of the viewer's left- and right eye, respectively. Thus, such imaging can be said to comprise two parts, namely bringing the image content into two images, and then providing each image to the viewer's left and right eye, respectively. There exist autostereoscopic solutions using e.g. lens arrays that project the different images in different directions. In many cases, however, the viewer wears glasses that manage what is transmitted to the left- and right eye. Such glasses can be implemented with active or passive devices.

Active glasses can comprise dynamic shutters and, hence, involve electronics, shutters, batteries, etc. The display separates the image content and the sequential separate images are displayed with an image frequency. The same frequency is then used by the eye glasses to cover/shut the glass eye that should not transmit the present image. Since separate images of high resolution can be used, active glasses can provide a high sharpness, often having equal resolution in 3D as in 2D. A disadvantage is the high monetary cost arising from the complexity of the glasses: They involve many electronic components, they have batteries that need to be charged, there is a need to double the frame rate (which may lead to bandwidth problems), the image content then needs to be synchronized with the glasses, etc.

Passive glasses can be inexpensive and can have a less complex design. Further, there is no need to synchronize the glasses with an image content display frequency or phase and there are no batteries that need to be charged, etc. Passive 3D glasses can be implemented with e.g. optical color filters or optical polarizers.

The display is correspondingly configured to render the image content suitable for the respective filter.

The use of passive optical color filters may require a very narrow selection or binning of the LED pixels which should be precisely matched with the color filters of the glasses. Additionally, glasses with optical color filters are still monetary expensive. Hence, the use of polarizing filters can be better suited to create 3D effects on LED screens.

Passive polarizing filters in the glasses can be implemented so that each lens of the glasses passes a different polarization type, e.g. so that the glasses can filter out the first polarization type for the one eye and the second polarization type for the other eye. Using this technique implies that the image content shown on the display is polarized accordingly.

The polarization of the display image content can be implemented using an active polarizing system or a passive polarizing system. An active shutter can switch between the polarization types at a high frame rate. In this way, it is possible to see the correct content for the left eye and right eye without losing image resolution. However, for big LED walls this solution requires large shutters implemented in the LED displays, which leads to a high monetary cost and increased complexity.

Hence, a fully passive solution seems beneficial. Such a solution comprises that both the glasses and the polarization in the display are passive. For example, it is possible to put passive polarizing filters directly on the LEDs in the display. A disadvantage is the resolution loss arising from the fact that only 50% of the LEDs can be seen by the left eye and the other 50% of the LEDs can be seen by the right eye. To overcome this loss, each pixel can be doubled and, hence, provide one full pixel for each eye. The disadvantage is the extra monetary cost and the increased amount of surface the additional pixels would require.

SUMMARY OF THE INVENTION

It is an objective of the present invention to provide a good passive 3D display system and display method, e.g. having an advantage of an improved resolution.

In one embodiment of the present invention, there is provided a system for displaying images prepared for 3D viewing comprising a display having display pixels, each pixel does or can comprise n sub-pixels of at least three primary colors such as the colors red, green and blue, wherein at most two colors are or can be represented by two or more sub-pixels,
 a polarization filter comprising areas arranged in a pattern,
 whereby each area has or can have one of two polarization types,
 wherein the pattern is or can be configured so that when the polarization filter is positioned on top of the pixels,
 each area aligns with a sub-pixel and
 all green sub-pixels under areas of the same polarization type are or can be uniformly distributed in the display.

This can increase the resolution for 3D images without having to double the amount of sub-pixels (which could lead to increased monetary cost and lack of space).

Additionally or alternatively, the display pixels have or can have a display pixel resolution and all green sub-pixels under areas of the same polarization type have a sub-pixel resolution, and said sub-pixel resolution is or can be equal to the display pixel resolution.

This can further increase the perceived resolution.

Additionally or alternatively, each display pixel can comprise a multiple of green sub-pixels. For example, the sub-pixel resolution can be 10-30% higher than the display pixel resolution.

This can further increase the perceived resolution.

Additionally or alternatively, the sub-pixels can be arranged in a Bayer layout.

This can further increase the perceived resolution.

Additionally or alternatively, the polarization types can be any combination of linear, circular or elliptical, s- and p-polarization, respectively.

In another embodiment of the present invention, there is provided a method for displaying images prepared for 3D viewing comprising a display having display pixels, each pixel comprises or can comprise n sub-pixels of at least three primary colors such as the colors red, green and blue,
 a polarization filter,
 wherein the method comprises configuring the display pixels so that at most two colors can be represented by two or more sub-pixels,
 configuring the polarization filter to comprise areas arranged in a pattern so that each area can have one of two polarization types,
 and when positioning the polarization filter on top of the pixels,
 each area being aligned or can align with a sub-pixel and all green sub-pixels under areas of the same polarization type can be uniformly distributed in the display.

This can increase the resolution for 3D images without having to double the amount of all sub-pixels (which could lead to increased monetary cost and lack of space).

Additionally or alternatively, the display pixels can have a display pixel resolution and all green sub-pixels under areas of the same polarization type can have a sub-pixel resolution,
and the method can comprise configuring the pattern so that said sub-pixel resolution is equal to the display pixel resolution.

This can further increase the perceived resolution.

Additionally or alternatively, the method can comprise configuring each display pixel to comprise a multiple of green sub-pixels. For example, configuring the sub-pixel resolution to be 10-30% higher than the display pixel resolution.

This can further increase the perceived resolution.

Additionally or alternatively, the method can comprise arranging the green sub-pixels in a Bayer layout.

This can further increase the perceived resolution.

Additionally or alternatively, the method can comprise configuring the polarization filters to comprise linear, circular or elliptical polarization, and s- and p-polarization, respectively.

BRIEF DESCRIPTION OF DRAWINGS

FIGS. 1a) and b) show an example of LED sub-pixels arranged in a Layout having a polarization filter on top (prior-art).

FIGS. 2a) and b) show an embodiment of the present invention comprising two different sub-pixel layouts in a display.

FIGS. 3a) to n) show different embodiments of the present invention comprising a multiple of different polarization patterns.

FIGS. 4a) and 4b) show an embodiment of the present invention comprising a sub-pixel layout.

FIGS. 5 a) to c) show an embodiment of the present invention comprising a sub-pixel layout and a polarization pattern and a combination of the two.

FIGS. 6a) to 6g) shows an embodiment of the present invention comprising a sub-pixel layout and a polarization pattern and filtered out sub-pixels of different color.

DEFINITIONS

A "display" screen can be composed of light emitting pixel structures referred to as "display pixels" or "pixels" where the amount of display pixels determines the "display resolution", sometimes referred to as the "native display resolution" or the "native pixel resolution". A measure of the display resolution can be the total number of display pixels in a display, for example 1920×1080 pixels. Each display pixel can emit light in all colors of the display color gamut (i.e. the set of colors the display is able to provide).

Each display pixel can be composed of light emitting structures referred to as "sub-pixels", often being able to emit the colors red (R), green (G) or blue (B) (but also white, yellow or other colors are possible). A display pixel can be composed of at least three sub-pixels: One red, one green and one blue sub-pixel. Additionally, the display pixel can comprise other sub-pixels in any of the aforementioned colors (to further increase the color gamut). Depending on the types of sub-pixels, the display pixel can then be referred to as a RGB-, RGGB-, RRGB-pixel, etc. While a single display pixel can generate all colors of the display color gamut, a single sub-pixel cannot.

The light emission of a single sub-pixel can be controlled individually so that each display pixel can emit the brightness and color required to form the requested image. The distinction between display pixels and sub-pixels, and display pixel resolution and sub-pixel resolution will be used consistently in this text.

The sub-pixel structures of a display screen can be arranged in a "sub-pixel layout", defining where each sub-pixel is positioned in the display.

Another measure for the display resolution can be the "pixel pitch" which can be the distance between the centres of the nearest neighbouring pixels. For example, in FIG. 4a), the pixel pitch between the pixels 141 and 142 is the distance 140 between the pixel centres. Alternatively, the pixel pitch can be the distance between any two points located within two neighbouring pixels at the same position relative their respective pixel centre.

Figure 1:
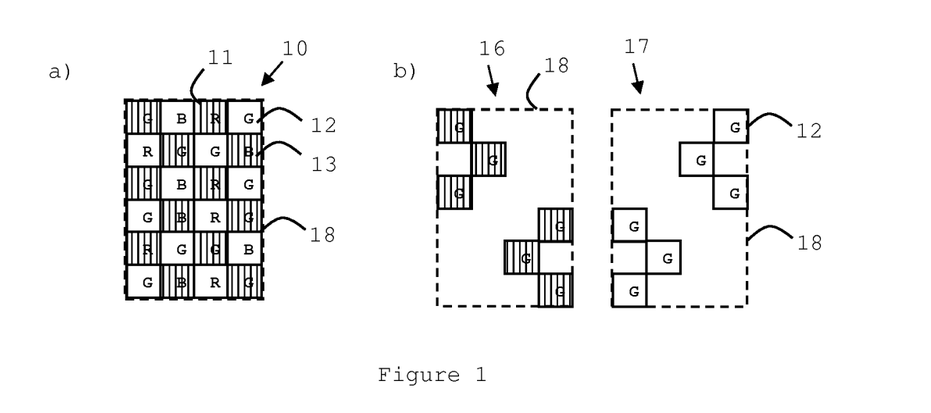
Figure 2:
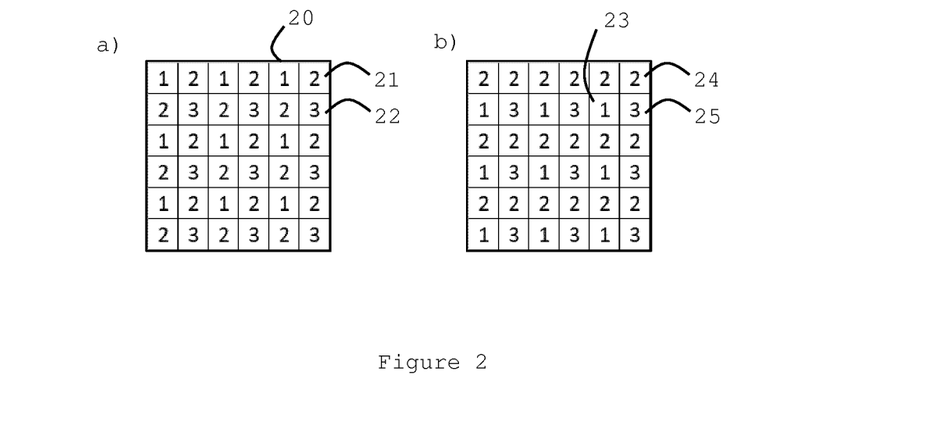
Figure 4:
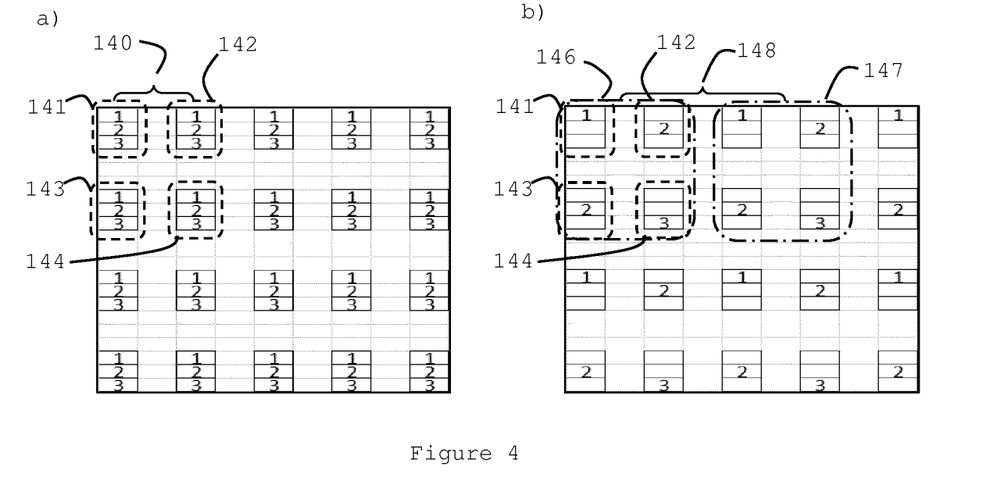

The sub-pixel pitch can be similarly defined as the distance between two sub-pixels of the same color, for example in FIG. 4a) the sub-pixel pitch (for sub-pixels of the same color) is the same as the pixel pitch. This is the case for all sub-pixels. FIG. 4 shows how sub-pixels and pixels can be located in a real display screen, while e.g. FIGS. 1 and 2 are more schematic (e.g. to emphasize the composition of the polarization pattern).

A "polarization filter" can comprise areas of different polarization, e.g. s- and p polarization, which in turn can be implemented using e.g. circular or linear polarization. The polarized light can be used for 3D displays where it is desired to divide the image into image content for the left and right eye of a viewer. This can be achieved if the viewer wears eyeglasses having the same polarization filters, so that each eye of the glasses filters out e.g. the s or p polarized light. Circular polarization can be beneficial for applications where rotational symmetry is desired, for example for TV or cinema applications where the effect should be the same even if the viewer tilts his head.

"Colors"—reference to the color "red" refers to a wavelength range of 610-630 nm, "green" to the range 515-545 nm and "blue" to the range 455-480 nm or to equivalent ranges which provide a visible red, green and blue color respectively.

DETAILED DESCRIPTION

It is an objective of the present invention to provide a good method and system for a passive 3D display. An advantage of embodiments of the present invention is that the perceived resolution is increased. Embodiments of the present invention comprise the configuration of the display pixels and sub-pixels in order to enable a fully passive 3D display system.

A method for obtaining an increased resolution of display systems showing 2D images is to arrange the sub-pixels in a Bayer layout, described in U.S. Pat. No. 3,971,065. Originating from a conventional pixel layout, a Bayer layout can be constructed by adding an extra green sub-pixel interleaved in the original pixel layout. This increases the physical pixel resolution, and even more the perceived resolution due to the human eye sensitivity to green color.

The present invention provides a method to use the increased resolution provided by additional green pixels, in 3D. The system comprises a polarization filter having areas of different polarization arranged in a pattern. When the polarization filter is overlaid onto the pixels of a display, the green sub-pixels of the pixels are filtered out by each polarization type. The pattern is constructed so that for each polarization type, the green sub-pixels are arranged in a uniform distribution over the display area. In an even more advantageous situation, the green sub-pixels have the same resolution as the display pixel resolution. This can greatly increase the perceived resolution that a human observer would experience of the 3D image (compared with the perceived resolution when the filtered green sub-pixels are non-uniformly distributed).

When constructing a polarization filter for a display, it may seem intuitive to distribute the polarizing areas of the polarizing filter in a symmetrical pattern over the pixels, for example to avoid creating visual patterns in the final image.

US20140015939A1 discloses a passive stereoscopic 3D display solution using polarizing filters where the sub-pixels have been arranged in a Bayer layout. FIG. 8D in US20140015939A1 shows the distribution of red, green and blue sub-pixels together with the polarization type (indicated with L and R). FIG. 8D of US20140015939A1 is reproduced as FIG. 1a) in the present application.

FIG. 1a) of the present application shows a sub-pixel collection 10 each having the color red, green or blue, for example 11, 12 or 13, respectively. A number of sub-pixels makes one pixel. For example, there can be three or four sub-pixels in one pixel. There is a polarization filter overlaid onto the sub-pixels, having a type 1 polarization (not striped) and a type 2 polarization (striped). For example, the green sub-pixel 12 is associated with the polarization of type 1 and the blue sub-pixel 13 is associated with the type 2 polarization. The first and second polarisations are preferably orthogonal to each other, so that polarised light that passes through one filter does not pass through another filter. It can be seen that the different polarization types (striped and non-striped areas) in FIG. 1a) are uniformly distributed over the sub-pixels. In FIG. 1b) the sub-pixels that have filtered out green light, are green sub-pixels that have been extracted from FIG. 1a) and are shown in FIG. 1b) as sub-pixel collection 16 for polarization type 2 and sub-pixel collection 17 for polarization type 1. The dashed sub-pixel border 18 from FIG. 1a) limits the sub-pixel collection 10. The border 18 is repeated for sub-pixel collections 16 and 17, so that the sub-pixel locations within the sub-pixel area 10 are emphasized. It can be seen that neither the green sub-pixels in 16 nor the green sub-pixels in 17 are distributed evenly within the sub-pixel collection area 10. Further, US20140015939A1 does not in any other way point to that special arrangement of the polarization filter would benefit the final resolution.

Experimental Results

The inventors investigated several polarization patterns where s- and p-polarization filters (of circular polarization) were distributed over a sub-pixel layout. Examples of the sub-pixel layouts are shown in FIG. 2a) and b). The sub-pixel layout in FIG. 2a) is arranged in a Bayer type layout and comprises sub-pixels of the colors red 20 (marked with "1"), green 21 (marked with "2") and blue 22 (marked with "3"). FIG. 2b) is arranged in a non-Bayer type layout and comprises sub-pixels of the colors red (marked with "1"), green 24 (marked with "2"), and blue 25 (marked with "3").

Figure 3:
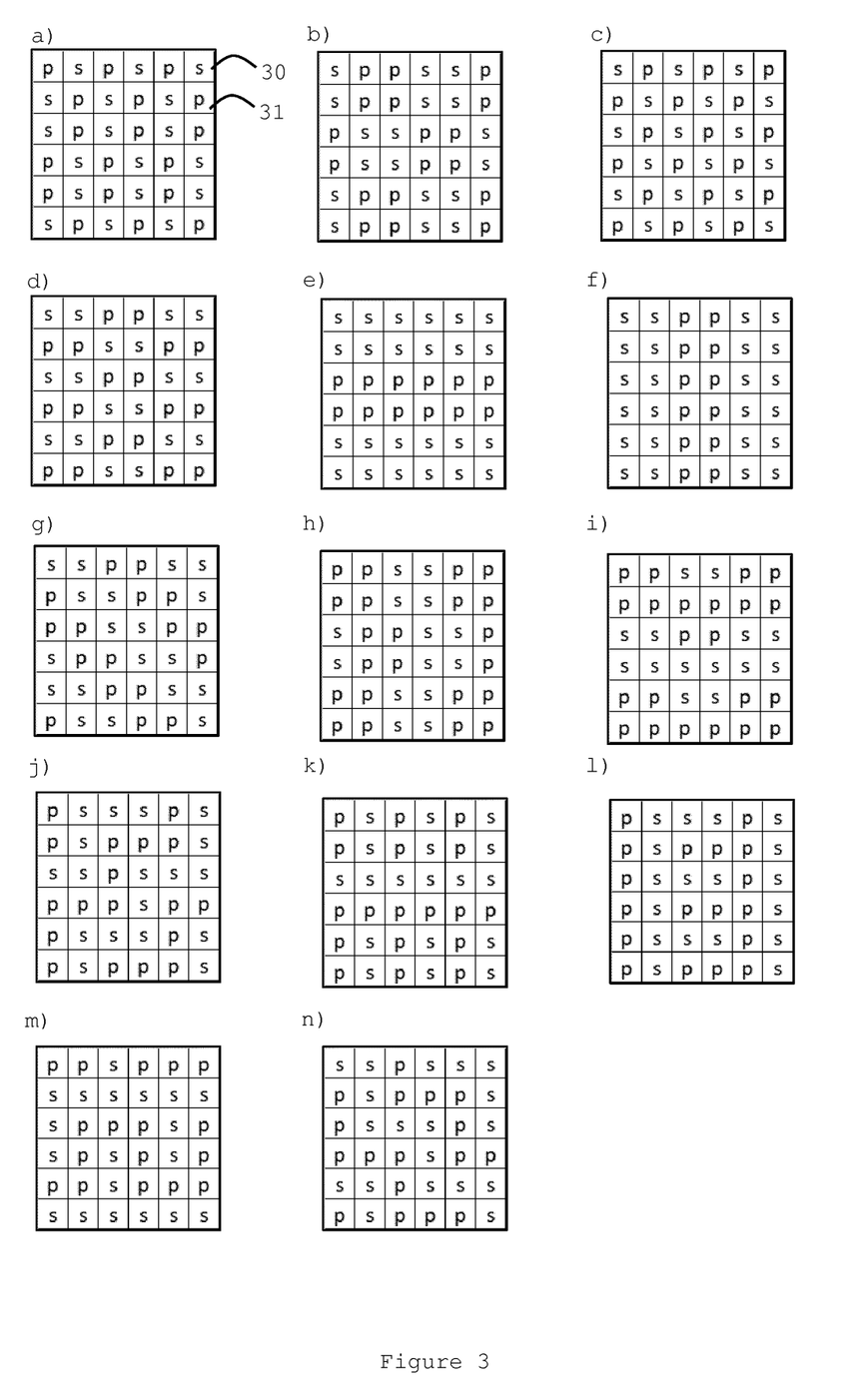

FIG. 3a) to n) show examples of different polarization patterns, e.g. coatings that transmit or reflect light having a specific polarization, that have been investigated. The patterns have regions having materials that function like polarization types s and p, for example 30 and 31 in FIG. 3a), respectively. The regions are arranged so that when put on top of a display area with sub-pixels, each region will be aligned with a sub-pixel. Note that the sub-pixel layouts and the polarization patterns shown in FIGS. 2 and 3 are merely subareas used for illustration. In reality the sub-pixel layouts and polarization patterns are repeated throughout the display.

The outcome of placing a selection of polarizing patterns onto the sub-pixel layouts of FIG. 2 was implemented (e.g. via simulation) by using an active 3D display and glasses with active shutters. The display was an LED display with a display pixel resolution 140 of 1.2 mm, as illustrated in FIG. 4a). Each pixel comprised one red ("1"), one green ("2") and one blue ("3") sub-pixel. The sub-pixels could then be selectively displayed so that a Bayer pattern having a display pixel resolution 148 of 2.4 mm could be created, with 1 display pixel 146 comprising 4 subpixels, RGGB or 141, 142 143, 144, (or pixel 147 with 4 sub-pixels) as illustrated in FIG. 4b). The filtering corresponding to putting a polarization pattern of FIG. 3 on top of the display layout in FIG. 4b) was then rendered in an active 3D video. By toggling between the "p" pattern and the "s" pattern at high framerate and observing the pattern through active glasses with shutters synced with the frame rate of the video it was possible to display the requested pattern to the intended eye.

More than 30 test persons were asked to evaluate the perceived resolution of 3D images implemented with the different combinations. The test persons were observing the patterns through eye glasses having the corresponding s- and p-polarization for the respective eye. A reference image and an image to be evaluated were shown to the test persons next to each other and in no specific order. The test persons were asked to point out which image they found to have the highest resolution, or if they deemed the images to be of equal resolution.

In the exercise, also sub-pixel layouts of non-Bayer type that were combined with the polarizing patterns of the present invention, scored better compared to the reference. However, the non-Bayer sub-pixel layouts were not suitable for 2D images (because the additional green pixels resulted in visual artefacts).

To everyone's surprise, it was not the evenly distributed polarization patterns, e.g. such as in FIG. 3c) or 1a) that provided the highest perceived resolution, but it was for example the pattern in FIG. 3j). To gain further understanding, the inventors investigated the sub-pixel distribution per color in each filtered image. They found that (for example) when using the zig-zag polarization pattern of FIG. 3j), the filtered out green sub-pixels had the same resolution as the display pixel resolution. They further found that if the resolution of the green sub-pixels was lower than the display resolution, a positive effect could be obtained if the green sub-pixels (of the same polarization) were uniformly distributed over the display area.

Since the resulting arrangement of the green sub-pixels depends on the combination of the initial display pixel layout and the overlaid polarization pattern, the amount of possible combinations is large. A distinctive condition for the present invention can therefore be defined as the resulting resolution and distribution of green sub-pixels with the same polarization in the display. It is desired to have an increase of the amount of green sub-pixels in the original display sub-pixel layout. Such an increase can for example be 10%, 20%, or preferably 30%. The corresponding increase in perceived resolution of a human eye would be higher, due to its sensitivity to the color green.

Exemplary Embodiments

Figure 5:
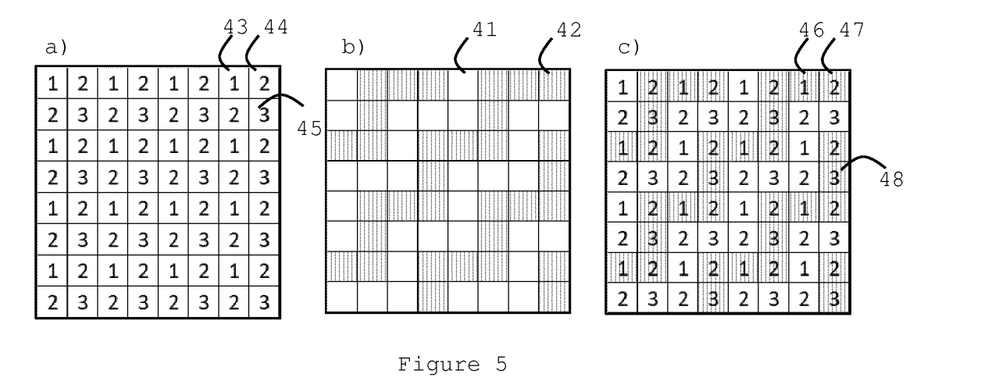
Figure 6:
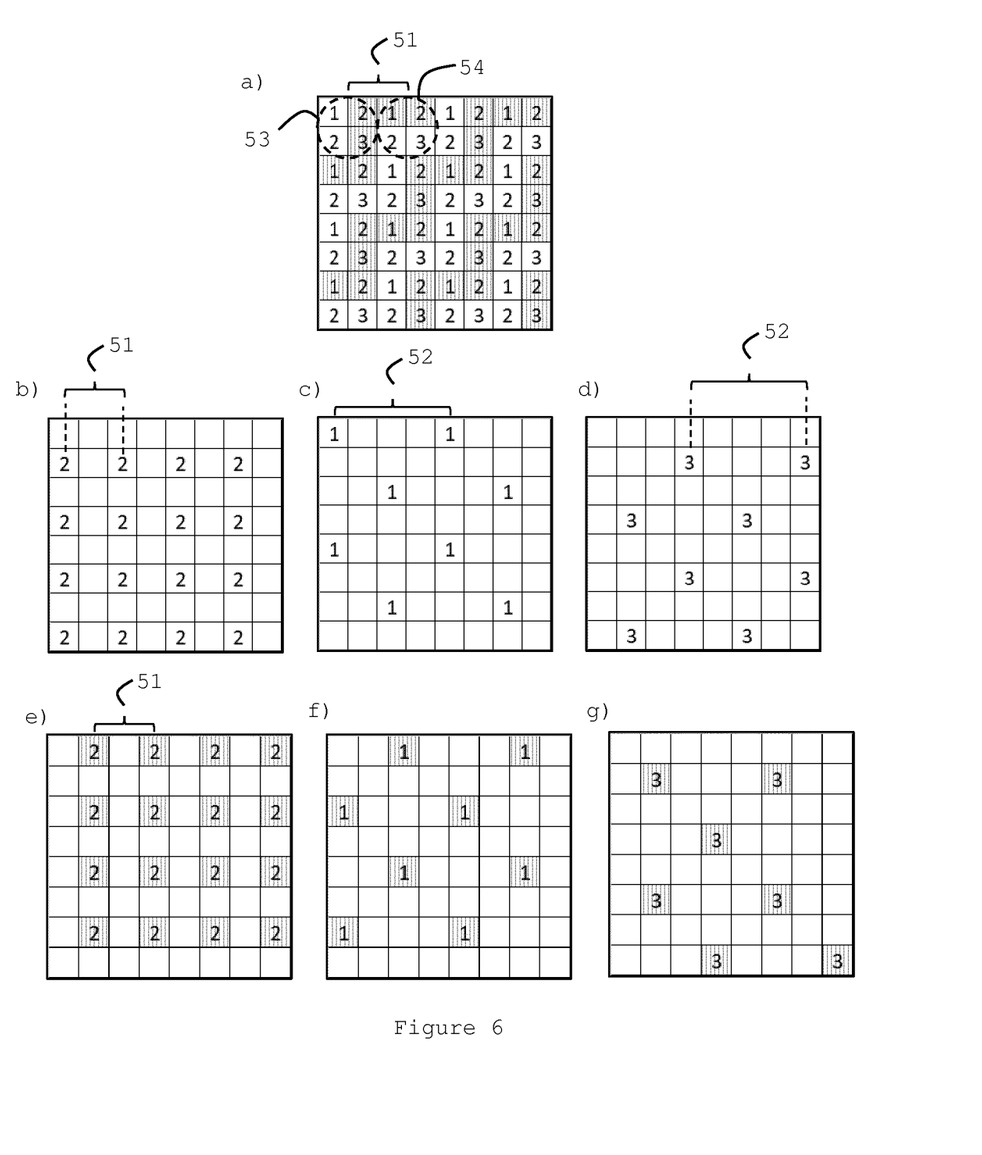

FIGS. 5 and 6 illustrate an exemplary embodiment of the present invention using the initial sub-pixel layout of FIG.

2a), reproduced in FIG. 5a) with "1", "2" and "3" representing different colors, e.g. 43, 44 and 45 respectively. In this embodiment, the colors are red ("1"), green ("2") and blue ("3"). The polarizing filter in FIG. 3j) has been reproduced in FIG. 5b) comprising a first polarization type (not striped) e.g. 41, and a second polarization type (striped) e.g. 42. In FIG. 5c) the polarization filter in FIG. 5b) is put on top of the sub-pixel layout in FIG. 5a) so that light from the sub-pixels is filtered by the polarization filter. Since there are three colors combined with two polarization types, there will be six types of filtered sub-pixels. For example, in FIG. 5c there are sub-pixels 46, 47 and 48 comprising the second polarization type (striped) together with the colors red ("1"), green ("2") and blue ("3"), respectively. To further clarify, FIG. 5c) can be split up in charts of the individual sub-pixel types. This is shown in FIG. 6a) to g) where FIGS. 6b), 6c) and 6d) correspond to sub-pixels being filtered with the first polarization type (not striped) and FIGS. 6e), 6f) and 6g) correspond to sub-pixels being filtered with the second polarization type (striped).

The display pixel layout has a pixel pitch 51. It can be seen that the resolution of both the filtered out green sub-pixels groups in FIG. 6 b) and e) has the same pixel pitch 51. Thus, the filtered out green sub-pixels have the same resolution (and distribution) as that of the display pixels. It can also be seen that this is not equal to the pixel pitch 52 of the filtered out red or blue sub-pixel groups in FIGS. 6c) and 6f) or 6d) and 6g), respectively.

If the display has the pixel arrangement in FIG. 2b), which is of non-Bayer type, the polarization patterns of the present invention can also yield an increase in resolution in 3D viewing. However, this solution is less suitable for 2D viewing since the green lines can be visible. When pixel arrangement is of Bayer type, as in FIG. 2a), the image can be correctly reproduced in both 2D and 3D viewing.

While the invention has been described hereinabove with reference to specific embodiments, this has been done to clarify and not to limit the invention. The skilled person will appreciate that various modifications of the described embodiments are possible without departing from the invention, the scope of which is defined in the attached claims.

The invention claimed is:

1. A system for displaying images prepared for 3D viewing, comprising:
a display having display pixels, each pixel comprising sub-pixels of at least the colors red, green and blue, where one or two colors are represented by two or more sub-pixels,
a polarization filter comprising areas of a first polarization type and areas of a second polarization type, wherein the areas of the polarization filter are arranged in a pattern, and wherein each area is selected from one of the first polarization type and the second polarization type,
wherein the pattern is configured so that,
when the polarization filter is positioned on top of the pixels,
each area aligns with a sub-pixel,
wherein more than half of a first set of the red, green, and blue sub-pixels are under areas of the first polarization type, and the other at least one of the first set of the red, green, and blue sub-pixels is under an area of the second polarization type,
all the green sub-pixels under areas of the first polarization type are uniformly distributed in the display so that a polarization filtered horizontal green sub-pixel pitch is the same as a polarization filtered vertical green subpixel pitch,
wherein more than half of a second set of the red, green and blue sub-pixels are under areas of the second polarization type, and the other at least one of the first set of the red, green, and blue sub-pixels is under an area of the first polarization type, and
all green sub-pixels under areas of the second polarization type are uniformly distributed in the display so that a polarization filtered horizontal green sub-pixel pitch is the same as a polarization filtered vertical green subpixel pitch.

2. The system according to claim 1, wherein the green subpixels are arranged in the pattern, each green subpixel having a column and row position in the second pattern, all green sub-pixels under areas of the one polarization type being in first rows and first columns and all green subpixels under areas of the second polarization type being in second rows and second columns, the first rows being different from the second rows and the first columns being different from the second columns.

3. The system according to claim 1, wherein the display pixels have a display pixel resolution and all green sub-pixels under areas of the same polarization type have a sub-pixel resolution,
and wherein said sub-pixel resolution is equal to the display pixel resolution.

4. The system according to claim 1, wherein each display pixel comprises a multiple of green sub-pixels.

5. The system according to claim 1, wherein the sub-pixel resolution of green sub-pixels is 10-30% higher than the display pixel resolution.

6. The system according to claim 1, wherein at least one of the polarization filtered horizontal green subpixel pitch or the polarization filtered vertical green subpixel pitch of the green sub-pixels is different from corresponding polarization filtered blue sub-pixel pitches or from polarization filtered red sub-pixel pitches.

7. The system according to claim 1, wherein "red" refers to a wavelength range of 610-630 nm, "green" to a range 515-545 nm and "blue" to a range 455-480 nm or to equivalent ranges which provide a visible red, green and blue color respectively.

8. The system according to claim 1, wherein the polarization types are linear polarization, circular polarization, elliptical polarization, s-polarization or p-polarization.

9. A method for displaying images prepared for 3D viewing, said method using
a display having display pixels, each pixel comprising sub-pixels of at least the colors red, green and blue,
a polarization filter,
where the method comprises:
configuring the display pixels so that one or two colors are represented by two or more sub-pixels,
configuring the polarization filter to comprise areas of a first polarization type and areas of a second polarization type, whereby the areas of the polarization filter to be arranged in a pattern so that each area has one polarization type selected from one of the two polarization types,
and when positioning the polarization filter on top of the pixels,
each area aligns with a sub-pixel,
wherein more than half of a first set of the red, green and blue sub-pixels are under the areas of the first polarization type, and the other at least one of the first set of the red, green, and blue sub-pixels is under an area of the second polarization type, all green sub-pixels under the areas of the first polarization type are uniformly distributed in the display so that a polarization filtered horizontal green sub-pixel pitch is the same as a polarization filtered vertical green subpixel pitch, wherein more than half of a second set of the red, green and blue sub-pixels are under the areas of the second polarization type, and the other at least one of the first set of the red, green, and blue sub-pixels is under an area of the first polarization type, and all green sub-pixels under the areas of the second polarization type are uniformly distributed in the display so that the polarization filtered horizontal green subpixel pitch is the same as the polarization filtered vertical green subpixel pitch.

10. The method according to claim 9, wherein the green subpixels are arranged in the pattern, each green subpixel having a column and row position in the pattern, all green sub-pixels under areas of the one polarization type being in first rows and first columns and all green subpixels under areas of the second polarization type being in second rows and second columns, the first rows being different from the second rows and the first columns being different from the second columns.

11. The method according to claim 9, wherein the display pixels have a display pixel resolution and all green sub-pixels under areas of the same polarization type have a sub-pixel resolution,
and the method comprises configuring the pattern so that said sub-pixel resolution is equal to the display pixel resolution.

12. The method according to claim 9, comprising configuring each display pixel to comprise a multiple of green sub-pixels.

13. The method according to claim 9, comprising configuring the sub-pixel resolution of green sub-pixels to be 10-30% higher than the display pixel resolution.

14. The method according to claim 9, wherein at least one of the polarization filtered horizontal green subpixel pitch or the polarization filtered vertical green subpixel pitch of the green sub-pixels is different from corresponding polarization filtered blue sub-pixel pitches or from polarization filtered red sub-pixel pitches.

15. The method according to claim 9, wherein "red" refers to a wavelength range of 610-630 nm, "green" to a range 515-545 nm and "blue" to a range 455-480 nm or to equivalent ranges which provide a visible red, green and blue color respectively.

16. The method according to claim 9, comprising configuring the polarization filter to comprise linear polarization, circular polarization, elliptical polarization, s-polarization or p-polarization.

* * * * *